United States Patent [19]

Freund

[11] 4,405,423
[45] Sep. 20, 1983

[54] METHOD FOR REMOVAL OF PHOSGENE FROM BORON TRICHLORIDE

[75] Inventor: Samuel M. Freund, Santa Fe., N. Mex.

[73] Assignee: The United States of America as represented by the U.S. Department of Energy, Washington, D.C.

[21] Appl. No.: 299,233

[22] Filed: Sep. 3, 1981

[51] Int. Cl.$^3$ ............................................. B01J 19/12
[52] U.S. Cl. ............................................. 204/157.1 R
[58] Field of Search .................... 204/157.1 P, 157.1 R

[56] References Cited

U.S. PATENT DOCUMENTS 4,063,896 12/1977 Merritt et al. ................ 204/157.1 P
4,146,449 3/1979 Clark et al. ................... 204/157.1 P

OTHER PUBLICATIONS

Hartford, Electro-Optical Systems Design, (Jan. 1981), pp. 40–42.
Hyer et al., J. App. Phys., (Nov. 1981).
Kuhn et al., Teitschrift für Physikalische Chemie, Part B, vol. 21, 1933, p. 136.
Maier et al., J. Chem. Phys. 69, (1978), 1961–1965.
Freund et al., Anal. Chem. 50, (1978), 1260–1262.
Freund et al., J. Amer. Chem. Soc., (1979), 101, 4522–4524.

Primary Examiner—Howard S. Williams
Attorney, Agent, or Firm—Paul D. Gaetjens; Samuel M. Freund; Richard G. Besha

[57] ABSTRACT

Selective ultraviolet photolysis using an unfiltered mercury arc lamp has been used to substantially reduce the phosgene impurity in a mixture of boron trichloride and phosgene. Infrared spectrophotometric analysis of the sample before and after irradiation shows that is is possible to highly purify commercially available boron trichloride with this method.

9 Claims, 5 Drawing Figures

METHOD FOR REMOVAL OF PHOSGENE FROM BORON TRICHLORIDE

This invention is the result of a contract with the Department of Energy (Contract No. W-7405-ENG-36).

BACKGROUND OF THE INVENTION

The present invention relates generally to purification and more particularly to the photolytic removal of phosgene impurity from boron trichloride using ultraviolet radiation.

Boron trichloride ($BCl_3$) is used in the electronics industry, as an additive for high energy fuels, and as a catalyst, among other uses. The commercially available compound contains in excess of 0.8% of phosgene ($COCl_2$) impurity. Efficient and economical $BCl_3$ purification methods have not been reported to date. Industrial purification procedures generally exploit small differences in macroscopic physical properties between the substance of interest and the contaminants present. For example, fractional distillation, which relies on the difference in vapor pressures of the compounds to be separated at a given temperature, would be an obvious choice were it not for the unfortunately close vapor pressure curves of $BCl_3$ and $COCl_2$. This means that the two components would distill at approximately the same rate.

The method of the instant invention utilizes differences in the microscopic molecular properties between $COCl_2$ and $BCl_3$ to achieve high separation selectivity. That is, the enormous difference in ultraviolet absorption cross sections for $COCl_2$ and $BCl_3$ allows the phosgene to selectively absorb radiation from a mercury arc lamp, causing its photodecomposition, while the boron trichloride remains essentially untouched because it does not significantly absorb such radiation.

Two U.S. patents describe photolytic purification processes which are relevant to the instant invention:

1. In the U.S. Pat. No. 4,063,896, dated Dec. 20, 1977, to Merritt and Robertson, the inventors teach photolytic destruction of phosgene by what is essentially a laser pyrolysis. Particular wavelengths of carbon dioxide laser emission in the 10 $\mu$m region of the infrared are absorbed by $BCl_3$ which then transfers some of its vibrational excitation to the phosgene impurity, which does not absorb such wavelengths, by means of molecular collisions. The enormous temperature increase in the laser radiation path causes the phosgene to preferentially decompose since it is more thermally unstable than the $BCl_3$. Such temperature increases, it might be argued, could be more reasonably obtained by heating the gas container. However, in the presence of hot walls it is likely that the $BCl_3$ destruction would increase dramatically. That is, the cold walls and heated gas appear to allow significant phosgene decomposition with minimal $BCl_3$ loss. The advantage and distinguishing feature of the method of the instant invention is that no laser source is required. A simple arc lamp with some output below 275 nm is sufficient. This feature renders our method much less expensive with regard to capital expenditure and operation and maintenance costs. Further, in our method, only the impurity molecules absorb radiation and consequently decompose with little energy wasted in heating the entire sample under irradiation. Therefore, the cost per impurity molecule removed is reduced. This is not to say, however, that an ultraviolet laser could not be used in place of the uv lamp.

2. In U.S. Pat. No. 4,146,449, dated Mar. 27, 1979 to Clark and Anderson, phosphine, arsine and diborane are photochemically removed from silane. Silane containing these impurities is irradiated by means of an ArF laser. A laser is necessary for their purification procedure since it is the only powerful light source available in the wavelength region of interest. That is, it is necessary to perform such photochemical separations at wavelengths where the difference between the absorption constants of the silane and the impurities is significant, which turns out to be around 193 nm, a wavelength where convenient and intense non-laser sources are not available. In our method, the relevant absorptions of $BCl_3$ and $COCl_2$ are well-separated, and the $COCl_2$ absorbs wavelengths emitted from commonly available mercury arc lamps, while the $BCl_3$ does not.

SUMMARY OF THE INVENTION

An object of the instant invention is to reduce the concentration of phosgene impurity in boron trichloride.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method of this invention may comprise (a) irradiation of impure boron trichloride with ultraviolet radiation at wavelengths longer than about 215 nm and of sufficient intensity to photolyze the phosgene impurity, and (b) removing the photolysis products from the resulting mixture.

Preferably a broad-band ultraviolet radiation source rich in wavelengths shorter than about 275 nm such as a mercury arc lamp is used, with appropriate high-pass filters, if wavelengths which might photolyze the $BCl_3$ ($\lambda < 215$ nm) are present. In a further aspect of the present invention, in accordnce with its objects and purposes, the method hereof may also comprise dissolving the impure $BCl_3$ in inert, transparent cryogenic solvents or actually liquefying the $BCl_3$ itself and (a) irradiating the resulting liquid with ultraviolet radiation at wavelengths longer than about 215 nm and of sufficient intensity to photolyze the phosgene impurity, and (b) removing the photolysis products from the resulting solution.

Preferably such inert cryogenic solvents will be krypton or xenon.

The benefits and advantages achieved by the method of the instant invention include the exploitation of the huge difference in molecular absorption coefficients for photolyzing ultraviolet radiation for $BCl_3$ and its principal impurity, phosgene, to achieve high separation selectivity. That is, when impure $BCl_3$ is irradiated with intense ultraviolet radiation at wavelengths between about 215 and 275 nm, the $COCl_2$ is photolyzed while the $BCl_3$ remains essentially unaffected. This is in contrast with bulk distillation, for example which relies on the almost insignificant difference in vapor pressure between the $BCl_3$ and $COCl_2$, a small difference in a bulk physical property, for its execution. The smaller such separation selectivities are, the less efficient and the more costly the purification process will be. The method of the instant invention provides high efficiency and cost effectiveness.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

Figure 1:
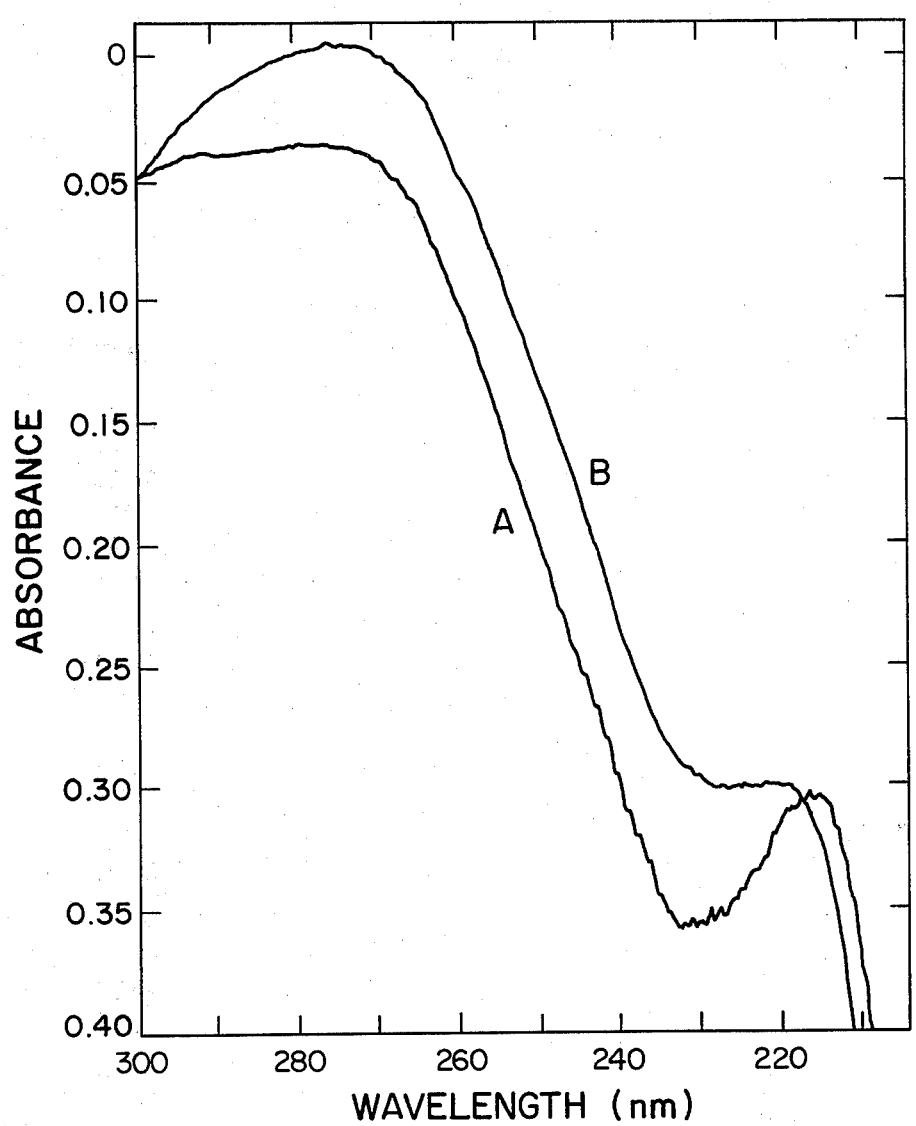
FIG. 1 shows the ultraviolet spectrum of 100 torr equivalent of $COCl_2$ in lliquid Xe at $-108°$ C. (A) and that of the same solution after 15 min. of photolysis with a 1000 watt mercury arc lamp (B).

The method of the instant invention utilizes the widely separated photodissociation onset energies of the principal compounds; $BCl_3$ and its chief impurity phosgene ($COCl_2$). FIG. 1 shows the ultraviolet (uv) absorption spectrum of 100 torr equivalent of $COCl_2$ (a torr equivalent is simply that concentration in solution which corresponds to one torr of the solute in the cell before the solution process is commenced) in liquid xenon (lXe) at $-108°$ C. (A), and that of the same solution after 15 min. of photolysis with a 1000 watt mercury arm lamp (B). It is known that this absorption band is a predissociated one and that photodissocation will occur at wavelengths shorter than about 275 nm, producing carbon monoxide (CO) and chlorine ($Cl_2$) as the ultimate products according to the reaction:

These products are stable gases with very different physical properties from $BCl_3$, and may easily be removed from the bulk sample. Carbon monoxide, for example is only slightly soluble in cryogenic solutions with rare gases as solvents so that an immediate separation of the CO product is effectuated. The phosgene peak absorption coefficient for the predissocative $\tilde{A} \leftarrow \tilde{X}$ transistion is measured to be $1.9 \times 10^{-19}$ cm$^2$ at about 230 nm.

Figure 2:
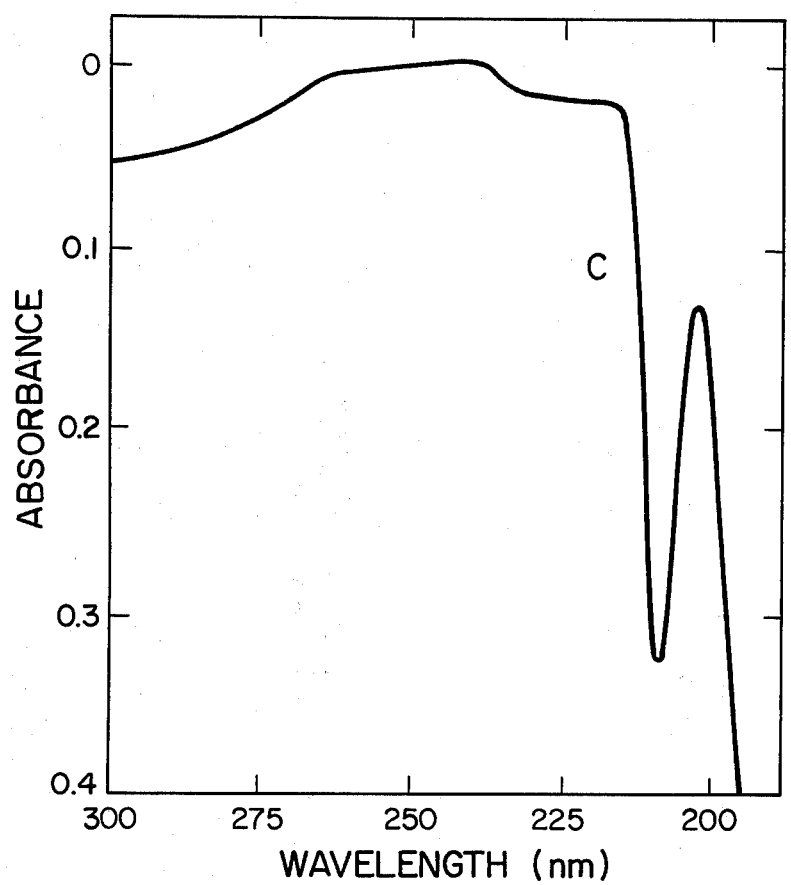
FIG. 2 shows the ultraviolet spectrum of 100 torr equivalent of $BCl_3$ in liquid Xe at $-108°$ C.

FIG. 2, on the other hand, shows the ultraviolet absorption spectrum of 100 torr equivalent of $BCl_3$ in lXe at $-108°$ C., showing that $BCl_3$ absorbs radiation of wavelengths shorter than about 210 nm. This is a known dissociation absorption feature of $BCl_3$ so that irradiation at wavelengths shorter than the absorption onset will result in loss of $BCl_3$ which is undesirable because of both the loss of photons and the loss of the material intended to be purified. Therefore, by restricting the photolyzing wavelengths to between about 275 nm and 215 nm, a maximum utilization of photons can be achieved with a minimum loss of $BCl_3$ utilizing the selective excitation of the $COCl_2$ molecules to a predissociative electronic state to remove this impurity by the reaction described in Eq. 1.

The ultraviolet spectra of neat $COCl_2$ and $BCl_3$ dissolved in lXe at $-108°$ C. shown in FIGS. 1 and 2 were taken using a Cary Model 17-D double-beam spectrophotometer. The path length here was typically 1.27 cm, and the inner and outer cell windows on the one-way cells used were sapphire and calcium fluoride, respectively. Typical time constants and scan speeds were 1 s and 0.2 nm/s, respectively.

It is important to mention that the solution-phase uv spectra of both $BCl_3$ and $COCl_2$ are qualitatively similar, although slightly shifted in wavelength to those obtained in the vapor-phase. It is further true that the bands in solution represent the identical vapor-phase bands spectroscopically. That is, the above-mentioned dissociative features are known to be so by analogy from the corresponding, previously carefully investigated vapor-phase spectra. Moreover, the liquid-phase photochemistry is derived by analogy to the well-known vapor-phase results. In particular, Eq. 1 is reasoned from the vapor-phase. Subject to certain unstable intermediates becoming stable in cryogenic solutions and giving rise to other photochemical pathways and small quantities of other final products, the major photochemical pathways appear to follow those observed in vapor-phase photolysis. Therefore, Eq. 1 is most likely the dominant reaction which occurs in solution. For scientific publications which support these conclusions, see e.g., W. B. Maier et al., J. Chem. Phys. 69, 1961 (1978) and S. M. Freund et al., J. Am. Chem. Soc. 101, 4522 (1979) (Freund I). Conversely, the method of the instant invention will work in a very similar fashion in the vapor-phase. As will be discussed below, the principal reason for choosing the cryogenic solution was to facilitate the analytical procedure of monitoring the phosgene removal. See, e.g., Freund et al., Anal. Chem. 50, 1260 (1978) (Freund II).

Photolysis of cryogenic solutions of commercially available $BCl_3$ in rare gas solvent provides a simple method of accurately observing the decrease of the phosgene impurity as a function of time since equivalent pressures of thousands of torr can usually be easily obtained. Further, because of the collapse of the rotation-vibration structure in such solutions, close lying absorption features of different species can often be accurately resolved. However, it turned out that at concentrations of $BCl_3$ approximately equivalent to a pressure of 1000 torr, ample $COCl_2$ absorption intensity existed to enable infrared spectrophotometric monitoring of its concentration down to approximately 1% of its initial value. The apparatus used for both the spectroscopy and the photochemistry experiments has been described in detail in Maier et al., supra. Photolyses were performed in two-way copper cells. Corning 9-57 uv filter material (4 mm thick) was used to pass uv light, and thallium bromide windows allowed simultaneous monitoring of the disappearance of $COCl_2$ with a Perkin-Elmer Model 180 double beam infrared spectrophotometer. No attempt was made to monitor products.

The $COCl_2$ concentration was monitored through a 2.6 cm pathlength usually at 840 cm$^{-1}$ ($\sigma_{ir}=1.49\times10^{-17}$ cm$^2$), and occasionally at 1817 cm$^{-1}$ ($\sigma_{ir}=8.1\times10^{-18}$ cm$^2$). These wavenumbers correspond to the collapsed and shifted $\nu_5$ and $\nu_1$ rotation-vibration bands, respectively, in liquid krypton (lKr) at $-153°$ C. The quoted $\sigma_{ir}$ values are the measured peak absorption cross-sections in the cryogenic solution at the wavelengths quoted. All infrared spectra were taken with a 1.5-2 s time constant at a scan speed of 0.05 cm$^{-1}$ s$^{-1}$. Full-width at-half-maximum absorbance of the observed spectral features ranged from 3-5 cm$^{-1}$. There was no reason for performing the uv spectroscopy in lXe and the photolyses in lXr other than the availability of these gases on the days the experiments were performed.

Matheson Gas Products boron trichloride, C.P. with stated purity of 99.9% min. was cryopumped and warmed several times for purification. Commercial, high purity krypton and xenon were used without further purification.

Solutions were prepared by sweeping measured quantities of gaseous $BCl_3$ into partially filled cells of liquefied solvent with gaseous solvent. Maier et al. and Freund I, supra. Prior to filling, the cell and the gas manifold were passivated for several minutes with about 1000 torr of $BCl_3$ which was then pumped away. The cell was then completely filled by liquefying additional solvent gas while vigorously stirring the solution by means of a Teflon-coated magnetic stirrer.

Initially, a Corning 9-54 filter was inserted between the source, a 1000 watt mercury arc lamp supplied by Oriel Corporation, and the sample to eliminate the uv emission below about 215 nm which would overlap the $BCl_3$ absorption band. This was later found to be unnecessary since the lamp itself was virtually no output below about 230 nm.

It had determined that there was little problem with solubility of the $COCl_2$ in liquid krypton (lKr). In particular, the 0.78% concentration of $COCl_2$ in the commercial $BCl_3$ sample was determined from the measured liquid-phase infrared absorption coefficient, $\sigma_{ir}$. This quantity was the average of a series of such determinations over a range of concentrations. Note that this is eight times the impurity level stated by the manufacturer.

Figure 3:
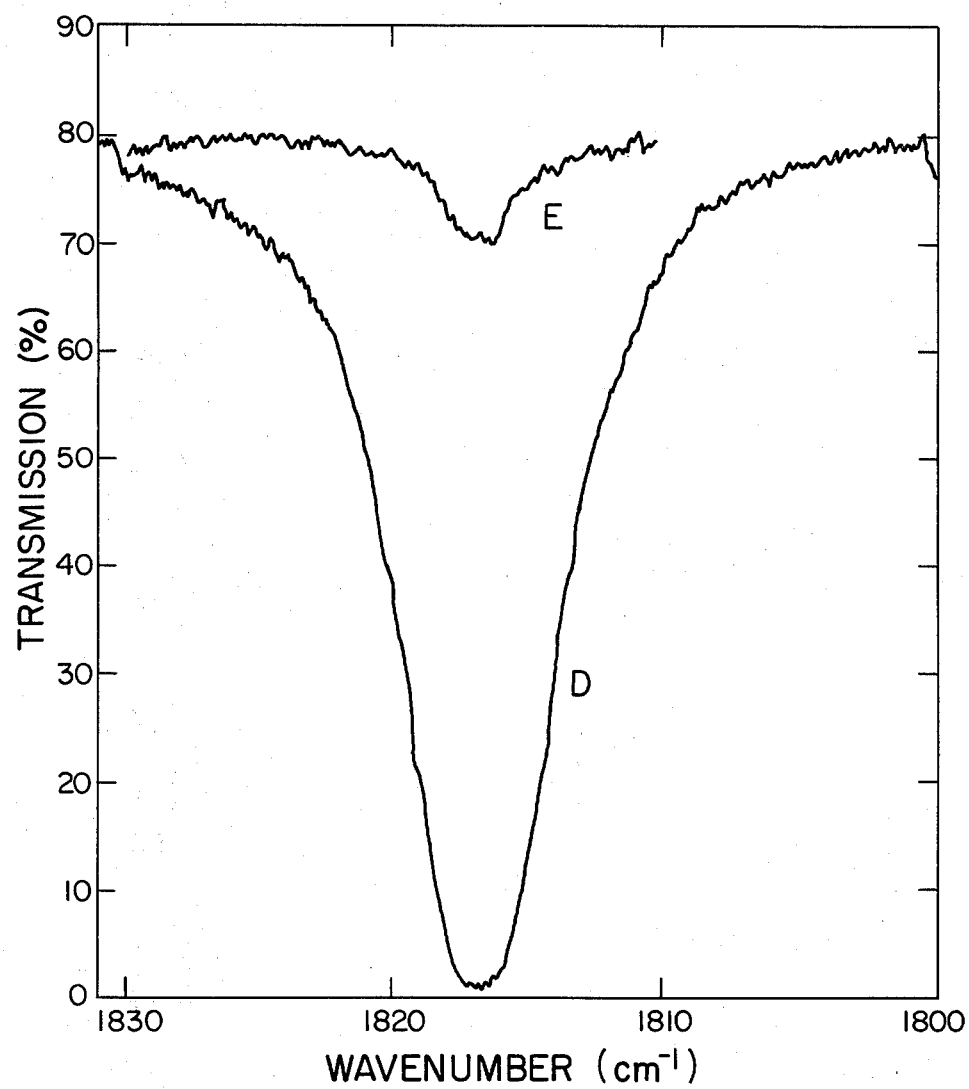
FIG. 3 shows the infrared spectrum of $COCl_2$ impurity found in 1000 torr equivalent of $BCl_3$ in liquid Kr at $-153°$ C.; (D) before photolysis, and (E) after 37 min. of photolysis with an unfiltered 1000 watt mercury arc lamp.

Curve (D) in FIG. 3 shows an infrared scan of the collapsed and shifted (1818 cm$^{-1}$ solution vs. 1827 cm$^{-1}$ for the gas) $\nu_1$-band of the phosgene present in 1000 torr equivalent of $BCl_3$ in lKr at $-153°$ C. As is shown in Curve (E) of FIG. 3, after about 37 min. of photolysis using the unfiltered arc lamp, about 3% of the original $COCl_2$ remains.

Figure 4:
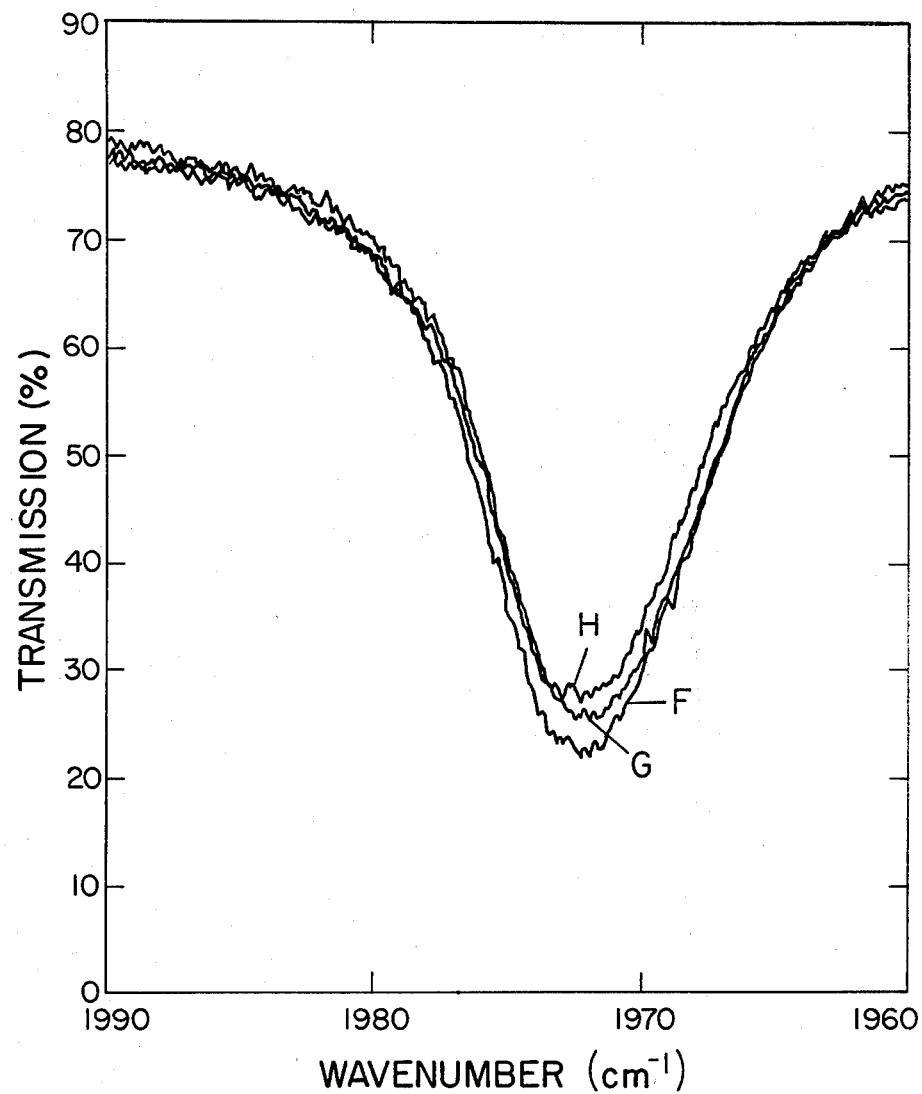
FIG. 4 shows the infrared spectrum of 1000 torr equivalent $BCl_3$ in liquid Kr at $-153°$ C. The feature corresponds to the collapsed and shifted $2v_3$-band of $^{10}BCl_3$. Trace (F) shows the feature immediately after a passivated cell was filled. Curve (G) shows the same situation, but one hour later. Curve (H) was taken after 37 min. of photolysis using an unfiltered 1000 watt mercury arc lamp which removed about 97% of the phosgene.

FIG. 4 shows an infrared spectrum of the collapsed and shifted (1972 cm$^{-1}$ solution vs. 1984 cm$^{-1}$ for the gas) $2\nu_3$ band of $^{10}BCl_3$. The overtone band of the less abundant boron isotope was used since the fundamentals of either isotopic species were effectively opaque to the infrared radiation used for the analyses. Trace (F) was taken immediately after filling a passivated cell to 1000 torr equivalent of $BCl_3$. Trace (G) was recorded approximately one hour later. Trace (H) was taken after 37 min. of photolysis of the sample using the unfiltered 1000 watt mercury arc light source which removed about 97% of the phosgene as was described in FIG. 3. As can readily be observed, virtually no $BCl_3$ has been destroyed. Note that the photolyzing radiation effects both boron isotopes identically, so that monitoring the $^{10}B$ in $BCl_3$ is a fair indication of the total $BCl_3$ consumed.

Figure 5:
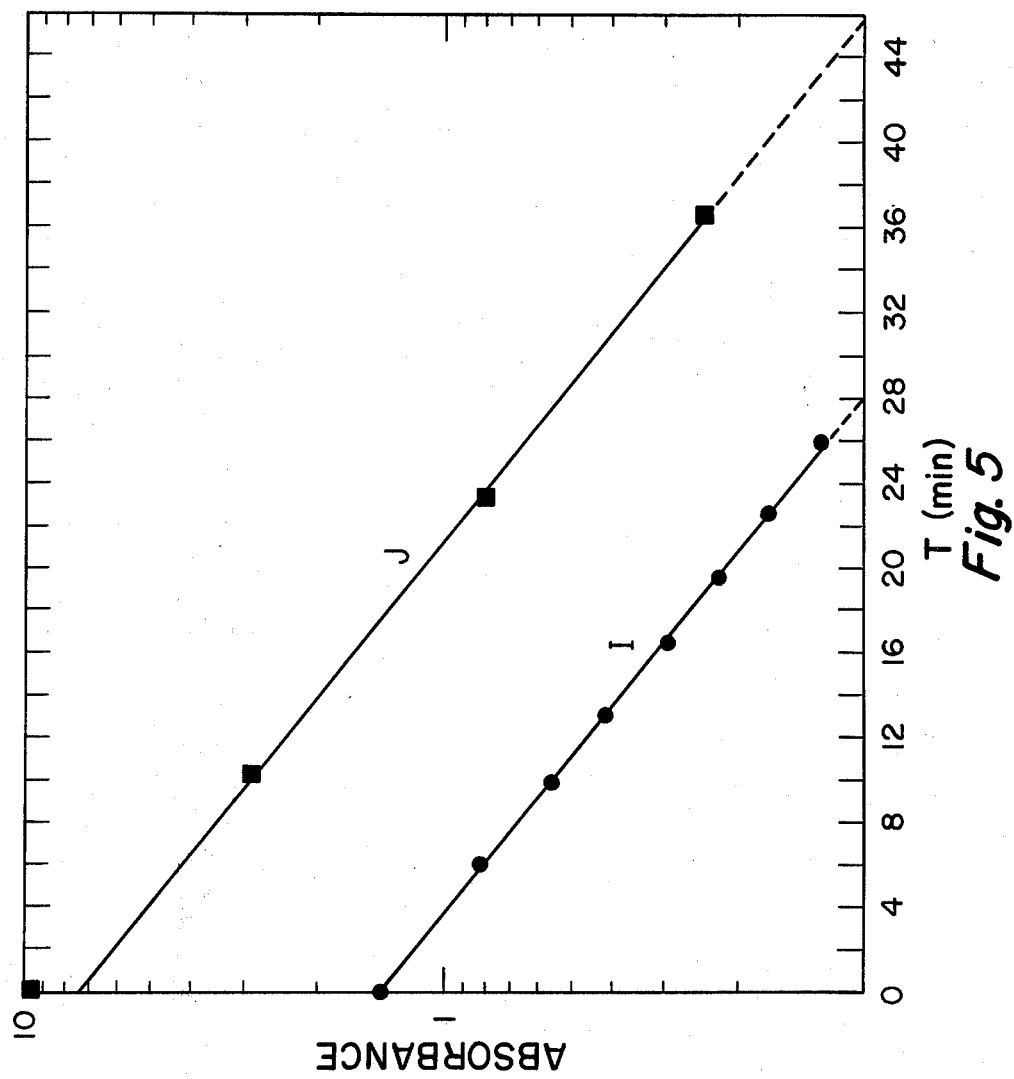
FIG. 5 shows a plot of the infrared absorbance [ln(I-$_o$/I)] of $COCl_2$ impurity in $BCl_3$ in liquid Kr at $-153°$ C. as a function of time during photolysis with an unfiltered 1000 watt mercury arc lamp. Curve (I) corresponds to the disappearance of phosgene impurity found in 149 torr equivalent of $BCl_3$, while curve (J) shows the disappearance of the impurity in a 1000 torr equivalent sample of $BCl_3$.

FIG. 5 shows traces of infrared absorbance [ln(I$_o$/I)] of phosgene impurity vs. time during photolysis for a solution of 150 torr equivalent of $BCl_3$ in lKr at $-153°$ C. (Curve (I), and a solution of 1000 torr equivalent of $BCl_3$ in lKr at $-153°$ C. (Curve (J). In both photolyses, the 840 cm$^{-1}$ $\nu_5$ feature of $COCl_2$ was monitored and the unfiltered 1000 watt mercury arc lamp was the photolysis source. In the former photolysis, the $COCl_2$ was reduced to about 9% of its original concentration in 25 min., while in the latter (which corresponds to FIGS. 3 and 4), the $COCl_2$ is reduced to about 3% in 37 min. The figure displays two important results. The linearity of the two traces shows that the sample is optically thin, and more importantly that the $COCl_2$ photolysis follows simple first order kinetic analysis. The factor of eight difference in $COCl_2$ concentration for the two photolyses without any significant deviation from a linear relationship as a function of time suggests that radical mechanisms are unimportant. It should be mentioned that the absorbance point for t=0 for curve (J) is a calculated point assuming 0.78% phosgene impurity in the $BCl_3$ as was actually determined from curve (I) and $\sigma_{ir}$. Its departure from the most reasonable line through the other points may reflect that the solution is nearing saturation for $COCl_2$ at this temperature. There is little doubt that the mechanism suggested by Eq. 1 applies in both the gas phase and in cryogenic solution which suggests that the photolysis method can be used to purify $BCl_3$ to very high purity levels.

In summary, then, the method of the instant invention provides a photolytic purification of boron trichloride by selective dissociation of the principle impurity, phosgene, while leaving the boron trichloride to be purified untouched. The instant method is more efficient than physical methods of purification since not all of the material is being subjected to the same process. Further, it is anticipated that the efficiency will be maintained to very high purity levels whereas physical separations become increasingly difficult and inefficient as the purity level increases (i.e., the impurity concentration decreases).

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for the photolytic removal of phosgene impurity from samples of boron trichloride, comprising the steps of:
   (a) irradiating a boron trichloride sample with ultraviolet radiation of sufficient intensity to photolyze the phosgene impurity therein; and
   (b) removing the photolysis products from the boron trichloride.

2. The method of claim 1 wherein said ultraviolet radiation is in the spectral range of about 215 to 275 nm.

3. The method of claim 2 wherein said ultraviolet radiation is broad-band radiation.

4. The method as described in claim 3, wherein said irradiating step is achieved with minimal destruction of the boron trichloride.

5. The method as described in claim 4, wherein the impure boron trichloride is first liquefied before said irradiating step.

6. A method for the photolytic removal of phosgene impurity from samples of boron trichloride, comprising the steps of:
   (a) dissolving boron trichloride in an inert, transparent cryogenic solvent forming a solution;
   (b) irradiating said solution with ultraviolet radiation of sufficient intensity to photolyze the phosgene impurity therein; and
   (c) removing the photolysis products from said solution.

7. The method of claim 6 wherein said ultraviolet radiation is in the spectral range of about 215 to 275 nm.

8. The method of claim 7 wherein said ultraviolet radiation is broad-band radiation.

9. The method as described in claim 8, wherein said inert, transparent cryogenic solvent is selected from the group consisting of krypton and xenon.

* * * * *